March 2, 1971          R. W. WALKUP          3,566,646
EXPLOSIVE ATTACHMENT APPARATUS
Filed April 18, 1968
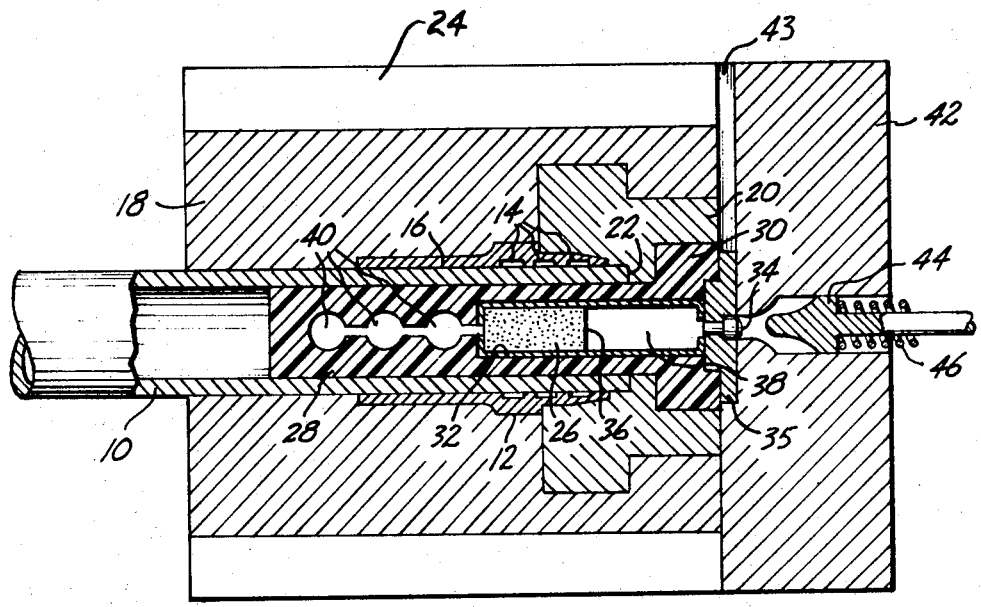
INVENTOR.
RICHARD WALKUP
BY
ATTORNEY

United States Patent Office 3,566,646
Patented Mar. 2, 1971

3,566,646
EXPLOSIVE ATTACHMENT APPARATUS
Richard W. Walkup, 14108 Bingham Ave. E.,
Tacoma, Wash. 98446
Filed Apr. 18, 1968, Ser. No. 722,310
Int. Cl. B21d 25/02
U.S. Cl. 72—56                    1 Claim

ABSTRACT OF THE DISCLOSURE

An apparatus for swaging a metal tube to a fitting by explosive attachment comprising an elastomeric member containing an explosive charge which is inserted into the tube. Upon detonation of the explosive charge, shock forces are transferred by the elastomer to the tube wall, swaging the tube to the fitting. An interior cavity in the elastomeric member relieves peak shock forces and entraps contaminants from the detonation.

BACKGROUND OF THE INVENTION

This invention relates to means for joining metal tubing and more particular to an explosive attachment apparatus for swaging metal tubing to a reconnectable or other fitting.

Metal tubing is used extensively in many mechanical systems for the conduction of fluids of various types including hydraulic fluid, compressed air, oxygen, nitrogen, or other gases. Particularly on large aircraft, a considerable quantity of metal tubing is used and as the various aircraft hydraulic and other fluid operated systems have become more complex, the quantity of tubing used has become a significant weight factor. In order to reduce this weight factor, effort has been directed to the incorporation of high-strength, thin wall steel and titanium tubing in aircraft to replace the more common stainless steel, copper, brass, or aluminum alloy tubing. While the use of high-strength, thin wall steel and titanium tubing is attractive for high pressure hydraulic systems, it is also feasible to use such tubing for oxygen and other compressed gas conduits on aircraft.

In nearly all tubing applications it is preferred to join lengths of tubing by a fitting so that the tubes can be disconnected and connected again for replacement, service operations, etc. It has been found that whether high-strength, thin wall tubing can be successfully employed depends to a great extent upon the development of a suitable fitting and a method of attaching the fitting to the tubing that does not impair the strength of the tubing and which is readily reconnectable. Various methods have been used to join fittings to tubing in the prior art and all of these methods have been found to possess disadvantages which limit the successful application of high strength tubing to aircraft and space vehicle systems. A threaded connection is definitely not suitable since the threads cut into the tubing walls weakening the tubing and thus requiring a heavier wall tubing to be used throughout the system. Brazing of the tubing to the fitting is not feasible in the case of steel and titanium alloys but these materials can be successfully welded. However, welding has not proved to be a satisfactory joining method not only because the welding operation often has an adverse effect upon the metallurgy and heat treatment of the tubing, but also because the quality of a welded joint is singularly dependent upon the skill of the welder. Furthermore, it is extremely difficult to test the quality of the welded joint which further adds to the quality control problem.

A preferred method of joining tubing to a fitting has been by swaging. Prior art methods of swaging tubing to fittings employs mechanical and hydraulic forces to deform the tubing into intimate contact with annular grooves, corrugations, or other configurations of the fitting. Because of the relatively large machines and power supplies required to generate the swaging forces, this type of operation has been limited to production line usage and even in that application its success has not been unqualified. The mechanical hydraulic swaging techniques are totally unsuitable for the field maintenance of an aircraft wherein it is often necessary to replace or repair a portion of tubing that is located in a relatively unaccessible location in the aircraft. In these instances, it is desirable to have a method for attaching tubing to a fitting that is compact, does not require an exterior power supply, and which does not demand undue strength on the part of the operator.

These objectives can be obtained with the successful application of explosive forming techniques to the swaging of tubing to a fitting. In explosive forming, forces generated by the detonation of an explosive charge are applied to the material to be formed causing its deformation into a die. In order to use this technique for swaging metal tubing, the magnitude as well as the application of the explosive forces must be carefully controlled so that sufficient force is uniformly applied to the tubing to ensure a swaged joint that is structurally sound and leakproof; and yet not so great that the tubing is fractured or its structure otherwise impaired. In addition, means must be provided for relieving excessive pressures generated by the explosive detonation and from preventing the intrusion of contaminants from the detonation into the bore of the tubing. The prevention of contamination is particularly important in the field maintenance of aircraft or space vehicles where the tubing must be swaged in situ since decontamination of tubing in such circumstances would be excessively burdensome and, in some instances, impossible.

SUMMARY OF THE INVENTION

It is therefore an object of this invention to provide means for using explosive forming to swage metal tubing.

It is another object of this invention to provide an explosive attachment apparatus for insertion into a tube to swage the tube to a fitting.

It is another object of this invention to provide an attachment apparatus for explosively swaging a metal tube to a fitting which does not introduce contamination into the tubing.

It is another object of this invention to provide a small portable explosive attachment tool for swaging tubing to fittings particularly adapted for the field maintenance of aircraft and space vehicles.

This invention provides an explosive attachment cartridge for swaging a metal tube to a fitting. The cartridge comprises a generally cylindrical member made of an elastomeric material adapted to be inserted into the interior bore of the metal tube. The elastomeric member contains an axial bore extending from one end thereof into which is inserted an explosive charge. Located interiorally of the elastomeric member is a plurality of cavities communicating with the axial bore through restricted passageways and primer means for detonating the explosive charge can be conveniently placed in the opening of the axial bore. Upon detonation of the explosive charge, considerable forces are generated within the elastomeric member and are transferred by the elastomeric material to the interior surfaces of the tubing. These forces deform the walls of the tubing causing the tubing to be swaged to the fitting. Peak shock forces are relieved by dissipation in the plurality of cavities and the detonation contaminants are entrapped within the elastomeric member preventing contamination of the tubing.

BRIEF DESCRIPTION OF THE DRAWING

The figure is a cross sectional view of an embodiment of this invention employed for swaging a metal tube to a fitting.

DESCRIPTION OF THE PREFERRED EMBODIMENT

The figure shows the apparatus of this invention for swaging tube 10 into sleeve fitting 12. While this invention may be used to swage tube 10 to various different types of tube fittings or to another tube, for purposes of illustration, a sleeve fitting 12 is shown having a plurality of annular grooves 14 formed in the interior peripheral wall 16 for receiving the deformed walls of tube 10 during the swaging operation. Because of the high forces involved during swaging, tube 10 and fitting 12 are held in relative positions by die 18 which is split along a longitudinal plane to facilitate assembly of the components and to permit removal of die 18 after fitting 12 has been swaged to tube 10. The position of fitting 12 on tube 10 is gaged by die insert 20 which is placed over the free end of tube 10 until the end face of tube 10 abuts against surface 22 of die insert 20. Split die 18 containing tube 10, sleeve 12, and die insert 20 can be conveniently held in the closed position by placing it in a clamping fixture such as die retainer 24.

The force for swaging tube 10 to interior wall 16 and into annular grooves 14 of fitting 12 is derived from the detonation of an explosive charge 26 which is contained in an elastomeric member 28. Elastomeric member 28 is generally cylindrical in shape in order to fit snugly within the bore of tube 10 and has a shoulder 30 at one end thereof in order to limit the depth of insertion into tube 10. Elastomeric member 28 has an axial bore and a counter-bore extending from the shoulder end 30 for reception of an explosive cartridge.

The explosive cartridge comprises a casing 32 normally made of a metal such as aluminum with an explosive charge 26 compressed into one end of casing 32 and sealed therein by seal 36 which is normally made of paper. The other end of casing 32 abuts against primer retainer 35 which has a reduced diameter positioned within the counterbore of shoulder end 30 of elastomeric member 28. Primer retainer 35 has an axial bore extending therethrough with a counterbore opposite casing 32 for receiving primer 34. Between seal 36 and primer retainer 35, there is within the explosive cartridge a flash tube 38 which transmits the explosive force of primer 34 to the explosive charge 26.

Positioned interiorally of the elastomeric member 28 are a plurality of pressure relief cavities 40 which provides relief and dissipation of the peak pressures generated by the detonation of explosive charge 26. Pressure relief cavities 40 also serves to entrap the products of combustion from explosive charge 26 such as fragments of the metallic casing 32, carbon deposits from the explosive charge 26 itself, and particles of the elastomeric member 28.

Primer means 34 may be any conventional primer device such as a percussion primer or an electric primer and, in some applications, a primer may not be required such as where the explosive charge 26 can be detonated directly by a laser beam or other energy device. In the figure, a small piston percussion primer 34 is shown. Means for detonating primer 34 are mounted in the end plate 42 of the die retainer 24 and comprises a firing pin 44 and a biasing spring 46 which urges firing pin 44 towards percussion primer 34. The firing pin is cocked by withdrawing it away from percussion primer 34 against the bias of spring 46 and locking it in the withdrawn position by means not shown. Upon release of the locking mechanism (not shown) piston 44 will spring forward and contact percussion primer 34 with sufficient energy to detonate primer 34.

In swaging a tube to a fitting according to the teachings of this invention, the end of tube 10 is first inserted through the bore of fitting 12. Die insert 20 is then placed over the end of tube 10 so that the end face of tube 10 abuts against the interior shoulder 22 of die insert 20. Fitting 12 is then positioned on tube 10 so that the exterior circumference of fitting 12 is against the interior conforming surface of die insert 20. In this manner, the position of fitting 12 is properly gaged from the end face of tube 10. Next, elastomeric member 28, containing explosive charge 26, primer retainer 35, and primer 34, is inserted through the bore of die insert 20 and into the interior bore of tube 10 until the shoulder 30 of elastomeric member 28 is seated into the counterbore of die insert 20. While the diameter of elastomeric member 28 is usually less than the interior diameter of tube 10 to insure an easy slip fit, it is often desirable to coat the outer cylindrical surface of elastomeric member 28 with a lubricant such as petroleum jelly, both to aid in the insertion of elastomeric member 28 into tube 10 and also to provide a continuous medium between elastomeric member 28 and the wall of tube 10 to insure the efficient transfer of the explosive force to the wall of tube 10. In order to prevent deformation of tube 10 beyond fitting 12 and to prevent deformation of fitting 12 itself, this assembly is firmly held by split die 18. The assembly is placed in one half of split die 18 and the two halves of the die are securely fastened together. This securing means may be built into the slip die 18, exterior clamping means such die retainer 24 may be conveniently used to restrain the split die halves 18 in the closed position. For production applications, die retainer 24 may be constructed in the nature of a fixed bench fixture and in cases of field maintenance of aircraft tubing or other such applications, die retainer 24 may be a portable hand-held device in the nature of a hand gun.

To swage tube 10 to fitting 12 it is now only necessary to detonate explosive charge 26. This may be accomplished in any one of a number of ways, two conventional techniques being by the use of an electric or a percussion primer. The figure exemplifies the use of a percussion primer 34 which is detonated by firing pin 44 conveniently positioned in end plate 42 of die retainer 24. To initiate the detonation of primer 34, firing pin 44 is cocked by withdrawing it away from primer 34 against the bias of spring 46. A locking device (not shown) may be used to hold firing pin 44 in the cocked position. Upon release of the locking device (not shown) spring 46 urges firing pin 44 against percussion primer 34 causing detonation of the percussion primer. The detonation flash from primer 34 passes through the bore in primer retainer 35 and down flash tube 38 reaching explosive charge 26 causing detonation of the explosive charge. The sustained explosive shock forces generated by the detonation of explosive charge 26 are uniformly transferred radially outward through the elastomeric material of elastomeric member 28 to the wall of tubing 10. The size of explosive charge 26 is selected so that the sustained shock forces transferred to the wall of tube 10 are sufficient to cause the wall of tube 10 to be deformed into annular grooves 14 of fitting 12 and to swage tube 10 to interior wall surface 16 of fitting 12.

In addition to providing a shock transfer medium to transfer the shock forces from the detonation of explosive charge 26 to the wall of tube 10, the elastomeric member 28 also serves to entrap the products of combustion generated by the detonation of explosive charge 26 and to prevent the contamination of the interior of tube 10. These potential contaminants are in the form of fragments of explosive charge casing 32, carbon particles from the explosive charge 26, and particles of elastomeric member 28 that may be partially shredded by the detonation. The entrapment of these contaminants is particularly assisted by pressure relief cavities 40 formed in the interior of elastomeric member 28 which are interconnected by restricted passageways and communicate with the axial bore in elastomeric member 28. In addition to entrapping the contaminant particles, pressure relief cavities 40 provide relief for the peak pressure forces generated by the detonation of explosive charge 26. Peak pressure relief is enhanced by interconnecting cavities 40 with restricted passages which have the effect of introducing a swirling motion into the expanding gases, reducing gas velocity, and distributing the pressure of the expanding gases along the length of elastomeric member 28 to prevent rupture of the elastomer and contamination of the interior bore of tube 10. After the detonation of explosive charge 26, the exhaust gases are permitted to escape to the atmosphere through the pathway defined by flash tube 38, the bore in primer retainer 35 and breach 43. If the apparatus of this invention is operated in a confined space, ventilation should be provided to further remove the gases exhausted from the detonation.

After tube 10 has been swaged to fitting 12, split die 18 is released from die retainer 24 and opened in order to permit the withdrawal of tube 10. Elastomeric member 28 is removed from the bore of tube 10 and discarded. Die insert 20 can then be removed from tube 10 and fitting 12. Tubing attached to a fitting according to the teachings of this invention has been subjected to mechanical tests to determine the effectiveness of the swaged joints. Tests were conducted according to military specification MIL-F-18280B on six samples of ⅜" O.D., ½ hard, high strength steel tubing having a wall thickness of 0.020 inch.

The samples, in addition to containing 3000 p.s.i. of hydraulic pressure, were subjected to rotary flexure so that a stress level of 35,000 p.s.i. was measured at a point on the tube wall ³⁄₁₆ in. from the end of a sleeve fitting explosively attached according to the teachings of this invention. After the application of 10 million cycles of rotary flexure, the swaged joints of five of the six samples remained intact and failure of the joints of these five could not be induced until an 80% higher stress level had been applied.

Elastomeric member 28 may be constructed from any one of a number of elastomers such as the various plastics and rubbers. However, it is important that this material have the correct physical properties so that elastomeric member 28 contains the detonation contaminants; and acts as a tamping material, a shock attenuater, and as a working fluid to transmit the energy of the detonated explosive to the tube wall. A material that has been found to be particularly suited for this application is a thermoplastic styrene butadiene designated Thermolastic 125 and manufactured by the Shell Chemical Co. This material possesses high strength, is of medium hardness, and can be readily fabricated by injection molding or by an extrusion process. It must be recognized that this material is exemplary only and for many applications other suitable elastomeric materials may be used satisfactorily.

To insure the reliability of the swaged joint between tube 10 and fitting 12, it is desirable to maintain elastomeric member 28 concentric with the inside walls of tube 10. In the case of steel tubing, the tolerance on the inside diameter is normally small so that the diameter of elastomeric member 28 may be sized to consistently provide a clearance of about 0.005 to 0.010 in. between elastomeric member 28 and the interior wall of tube 10. However, in the case of aluminum tubing, the tolerance on the inside diameter is generally large and a consistent clearance between elastomeric member 28 and the interior wall of tube 10 cannot be relied upon. Where the clearance has amounted to about 0.15 in., a noticeable degradation in the swaged joint has been observed. If the elasticity of elastomeric member 28 is sufficiently high, elastomeric member 28 can be sized to provide an interference fit with the interior bore of tube 10 thus insuring concentricity of the two. But where the elasticity is such that an interference fit makes insertion of elastomeric member 28 into the bore of tube 10 difficult, concentricity can be maintained by integrally forming an annular ridge or ring around the circumference of elastomeric member 28 to resiliently engage the inside wall of tube 10. In this manner the annular ridge can be made sufficiently resilient to accommodate the relatively wide tolerances encountered in the inside diameters of aluminum tubing.

Since elastomeric member 28 is designed to slip fit into the interior bore of tube 10, it is obvious that elastomeric member 28 will be of a different diameter for each different size of tube 10 to be swaged to fitting 12. It is also apparent that the size of explosive charge 26 will vary according to the material of which tube 10 is made as well as the size of tube 10. It has therefore, been found convenient in the practice of this invention, to prepare a variety of different sizes of elastomeric members 28 containing correspondingly different sizes of explosive charge 26; each size of elastomeric member 28 with its accompanying explosive charge 26 being particularly suited for swaging a particular size and type of tubing. While any one of a number of readily available explosive materials may be used for explosive charge 26, the following table shows the sizes of explosive charges made of lead azide that have been effective in swaging tubing of the various diameters and materials indicated:

| Tubing O.D., inch | Tubing wall thickness in. | Tubing material | Charge size, lead azide, grains |
|---|---|---|---|
| ¼ | .016 | ½ hard steel | 1.0 |
| ⅜ | .020 | do | 2.25 |
| ½ | .026 | do | 3.25 |
| ⅝ | .033 | do | 7.5 |
| ¼ | .035 | Aluminum | 0.5 |
| ⅜ | .035 | do | 1.5 |
| ½ | .035 | do | 2.0 |
| ⅝ | .035 | do | 2.5 |
| ¾ | .035 | do | 3.0 |

The foregoing table is exemplary only, and the teaching of this invention may be used to explosively attach tubing of other diameters and wall thicknesses as well as tubing of other materials such as stainless steel, copper, brass, titanium, etc.

Thus, by fabricating explosive attachment cartridges comprising properly dimensioned elastomeric members 28, properly sized explosive charges 26 and primers 34, tubing of various sizes and materials may be readily swaged to fitting in either production or in field maintenance with the absolute minimum dependency upon the skill of the operator. It is only necessary to provide the operator with an assortment of these assembled explosive attachment cartridges along with an assortment of dies properly sized for each type of tubing to be swaged. While the explosive charges 26 as disclosed herein are of sufficient strength to yield a reliable swaged joint, the explosive forces of their detonation are not so great as to cause damage to the tubing nor to interfere with the normal production or field maintenance activity. While a certain amount of acoustic energy; i.e., air pressure waves, is transferred down the length of the tube upon the detonation of the explosive charge, it has not been necessary to provide a special area secured from the normal production areas nor has it been found necessary in field maintenance to remove the tubing to be swaged from the aircraft. It is also significant that by using the elastomeric member 28, as taught by this invention, there is no contamination of the tube with products from the detonation. Also, since the dies used to hold the tube and fitting in position during the swaging operation are of relatively modest dimensions, the apparatus of this invention can be readily incorporated into a small, portable, hand held tool thus greatly facilitating the maintenance, repair, and modification of hydraulic and other fluid conduit systems in an aircraft and a space vehicle. In addition, the compactness of the apparatus of this invention has permitted the explosive attachment of a sleeve fitting on a ¼" O.D. tube with a minimum straight tube length of 0.8 in. from the end of the tube to the radius of a 90° bend. Comparable minimum straight tube lengths are possible with other sizes of tubing. Thus, this invention will find wide application in areas other than aircraft or space vehicles such as industrial machines including machine tools, hydraulic forming machines and presses, heavy construction and earth moving equipment, automobiles, marine propulsion machinrey, and wherever hydraulic and fluid conduits must be assembled and maintained.

What is claimed is:

1. An explosive attachment self-contained shock swage cartridge for swaging a tube to a fitting comprising:
    (a) an elastomeric member for insertion into the tube; said elastomeric member having a bore in one end thereof terminating in a bottom end and said elastomeric member further having a plurality of cavities interconnected through orifices with the bottom end of said axial bore;
    (b) a designed high energy explosive charge means positioned in said axial bore for generating a force which is transferred by said elastomeric member to the tube for swaging the tube to the fitting;
whereby peak forces generated by said explosive means are relieved by said orifices and cavities and contaminants from said explosive means are entrapped by said elastomeric member.

References Cited
UNITED STATES PATENTS

| | | | |
|---|---|---|---|
| 3,127,923 | 4/1964 | Cadwell | 72—56 |
| 3,290,770 | 12/1966 | Silverman | 29—421 |
| 3,225,578 | 12/1965 | Krieger | 72—56 |
| 3,409,969 | 11/1968 | Simons et al. | 72—56 |
| 3,426,681 | 2/1969 | Oliver | 29—421 |
| 3,446,047 | 5/1969 | Cleland | 29—421 |

RICHARD J. HERBST, Primary Examiner

U.S. Cl. X.R.

29—241